United States Patent [19]

Hayden, Jr. et al.

[11] Patent Number: 5,421,855
[45] Date of Patent: Jun. 6, 1995

[54] PROCESS FOR CONTINUOUS PRODUCTION OF METALLIC URANIUM AND URANIUM ALLOYS

[75] Inventors: Howard W. Hayden, Jr., Oakridge, Tenn.; James A. Horton, Livermore, Calif.; Guy R. B. Elliott, Los Alamos, N. Mex.

[73] Assignee: The United States of America as represented by the United States Department of Energy, Washington, D.C.

[21] Appl. No.: 67,909

[22] Filed: May 27, 1993

[51] Int. Cl.⁶ .............................................. C22B 60/02
[52] U.S. Cl. ...................................... 75/393; 75/399; 204/1.5
[58] Field of Search ................. 75/393, 399; 423/5; 204/1.5

[56] References Cited

U.S. PATENT DOCUMENTS

| | | | |
|---|---|---|---|
| H857 | 12/1990 | Haas | 204/1.5 |
| 2,834,672 | 5/1958 | Foster et al. | 75/399 |
| 2,886,429 | 5/1959 | Cooke et al. | 75/399 |
| 2,887,356 | 5/1959 | Arnoff | 423/257 |
| 3,109,731 | 11/1963 | Knighton | 75/399 |
| 3,607,146 | 9/1971 | Ballard | 423/260 |
| 3,801,307 | 4/1974 | Hurd | 75/399 |
| 3,906,081 | 9/1975 | Welty | 423/261 |
| 4,020,146 | 4/1977 | Knudsen | 423/261 |
| 4,412,861 | 11/1983 | Kreuzmann | 75/399 |
| 4,534,792 | 8/1985 | Elliott | 75/84.1 R |
| 4,552,588 | 11/1985 | Elliott | 75/84.4 |
| 4,564,507 | 1/1986 | Elliott | 423/5 |
| 4,591,382 | 5/1986 | Elliott | 75/84.1 R |
| 4,636,250 | 1/1987 | Elliott | 75/84.1 A |
| 5,104,095 | 4/1992 | Elliott et al. | 266/87 |
| 5,164,050 | 11/1992 | Bertaud et al. | 204/1.5 |

*Primary Examiner*—Ngoclan Mai
*Attorney, Agent, or Firm*—Miguel A. Valdes; William C. Daubenspeck; William R. Moser

[57] ABSTRACT

A method is described for forming metallic uranium, or a uranium alloy, from uranium oxide in a manner which substantially eliminates the formation of uranium-containing wastes. A source of uranium dioxide is first provided, for example, by reducing uranium trioxide ($UO_3$), or any other substantially stable uranium oxide, to form the uranium dioxide ($UO_2$). This uranium dioxide is then chlorinated to form uranium tetrachloride ($UCl_4$), and the uranium tetrachloride is then reduced to metallic uranium by reacting the uranium chloride with a metal which will form the chloride of the metal. This last step may be carried out in the presence of another metal capable of forming one or more alloys with metallic uranium to thereby lower the melting point of the reduced uranium product. The metal chloride formed during the uranium tetrachloride reduction step may then be reduced in an electrolysis cell to recover and recycle the metal back to the uranium tetrachloride reduction operation and the chlorine gas back to the uranium dioxide chlorination operation.

30 Claims, 4 Drawing Sheets

```
┌─────────────────────────────────────────┐
│  PROVIDING A SOURCE OF URANIUM TRIOXIDE │
└─────────────────────────────────────────┘
                    │
┌─────────────────────────────────────────┐
│  REDUCING THE URANIUM TRIOXIDE WITH     │
│  A REDUCING AGENT SUCH AS HYDROGEN      │
│  OR CARBON TO FORM URANIUM DIOXIDE      │
└─────────────────────────────────────────┘
                    │
┌─────────────────────────────────────────┐
│  CHLORINATING THE URANIUM DIOXIDE IN    │
│     A BATH OF MOLTEN URANIUM            │
│  TETRACHLORIDE IN THE PRESENCE OF       │
│   CARBON (AND OPTIONALLY CARBON         │
│      MONOXIDE GAS) TO FORM              │
│        URANIUM TETRACHLORIDE            │
└─────────────────────────────────────────┘
                    │
┌─────────────────────────────────────────┐
│  COLLECTING THE URANIUM TETRACHLORIDE   │
│         AS A SOLID OR LIQUID            │
└─────────────────────────────────────────┘
                    │
┌─────────────────────────────────────────┐
│   REDUCING THE URANIUM TETRACHLORIDE    │
│     (IN THE OPTIONAL PRESENCE OF A      │
│   SECOND METAL CAPABLE OF FORMING A     │
│    EUTECTIC WITH METALLIC URANIUM)      │
│  BY REACTING URANIUM TETRACHLORIDE      │
│    WITH A THIRD METAL CAPABLE OF        │
│   REDUCING URANIUM TETRACHLORIDE TO     │
│    METALLIC URANIUM WHILE FORMING       │
│   THE CHLORIDE OF THE THIRD METAL       │
└─────────────────────────────────────────┘
                    │
┌─────────────────────────────────────────┐
│  REDUCING THE RESULTANT METAL CHLORIDE  │
│  IN AN ELECTROLYSIS CELL TO FORM THE    │
│  THIRD METAL AND ALSO FORM CHLORINE GAS │
└─────────────────────────────────────────┘
                    │
┌─────────────────────────────────────────┐
│  RECYCLING THE REDUCED METAL BACK TO    │
│  THE URANIUM TETRACHLORIDE REDUCTION    │
│   STEP AND RECYCLING THE CHLORINE GAS   │
│     BACK TO THE CHLORINATION STEP       │
└─────────────────────────────────────────┘
```

FIG. 1

PROCESS FOR CONTINUOUS PRODUCTION OF METALLIC URANIUM AND URANIUM ALLOYS

The invention described herein arose in the course of, or under, Contract No. W-7405-ENG-48 between the United States Department of Energy and the University of California for the operation of Lawrence Livermore National Laboratory; and in the course of, or under Contract No. DE-AC05-84OR21400 between the United States Department of Energy and Martin Marieta Energy Systems, Inc. for the operation of Oak Ridge National Laboratory.

BACKGROUND OF THE INVENTION

This invention relates to the production of uranium metal and uranium-containing eutectic alloys useful in the production of fuel for nuclear reactors.

Conventionally uranium fuel for nuclear reactors is produced from a naturally occurring isotopic mixture of $^{238}U$ and $^{235}U$ which is converted to the hexafluoride usually referred to as $UF_6$, and which has been processed to form the desired isotopic ratio of the two uranium hexafluorides by the well known gaseous diffusion (GDP) or gas centrifuge (GCP) processes and then typically converted to uranium oxide which is then fabricated into the desired shape, e.g., pellets, for use in fuel rods for nuclear reactors.

However, the gaseous diffusion process requires large amounts of energy to carry out the isotopic separation and also results in the productions of large amounts of fluoride wastes (frequently referred to as "tails"), creating an enormous disposal problem. This, in turn, has led to the development of better processes for separating uranium isotopes which are more cost effective and which generate less undesirable waste side products. One such isotopic separation process uses metallic uranium, or uranium-containing alloys, as a starting material.

$UF_6$ could be used as a uranium source to produce the metallic uranium (or uranium-containing metal alloy) starting material needed for such a separation process, by reducing the $UF_6$ using a reduction process such as, for example, the well known metallothermic reduction process (Ames process) by first reducing the $UF_6$ to $UF_4$, and then reducing the $UF_4$ with metallic magnesium to form metallic uranium and a magnesium fluoride by-product. Reduction processes such as this, however, still result in the undesirable formation of large amounts of uranium-contaminated fluoride wastes and is highly labor intensive.

It would, therefore, be desirable to provide a process for the production of metallic uranium and/or uranium-containing alloys which would be economical and result in the production of little, if any, uranium-contaminated waste products, thus eliminating the problem of disposal of uranium-contaminated waste materials.

SUMMARY OF THE INVENTION

It is, therefore, an object of the invention to produce metallic uranium and/or one or more uranium-containing alloys in a manner which will substantially eliminate production of uranium-contaminated waste materials.

It is another object of the invention to produce metallic uranium and/or one or more uranium-containing alloys from uranium oxide by converting the uranium oxide into an intermediate material which is reducible to form metallic uranium or a uranium alloy.

It is still another object of the invention to produce metallic uranium and/or one or more uranium-containing alloys from uranium oxide by converting the uranium oxide into a uranium salt which is then reacted with a metal to form the corresponding salt of that metal while reducing the uranium salt to metallic uranium.

It is yet another object of the invention to produce metallic uranium and/or one or more uranium-containing alloys from uranium oxide by converting the uranium oxide into a uranium chloride which is then reacted with a metal to form the chloride of that metal while reducing the uranium chloride to metallic uranium.

It is another object of the invention to produce metallic uranium and/or one or more uranium-containing alloys from uranium oxide by converting the uranium oxide into a uranium chloride in a bath of molten uranium chloride and then reacting the uranium chloride intermediate reactant with a metal to form the chloride of that metal while reducing the uranium chloride to metallic uranium.

It is a further object of the invention to produce metallic uranium and/or one or more uranium-containing alloys from uranium oxide by converting the uranium oxide into a uranium chloride in a molten bath of uranium chloride and then reacting the uranium chloride with a metal to form the chloride of that metal while reducing the uranium chloride to metallic uranium wherein the resulting metal chloride is reducible to form chlorine and recyclable metal useful, respectively, in the step of chlorinating the uranium oxide and in the step of reducing the uranium chloride, whereby the production of waste products contaminated by uranium is substantially eliminated.

It is yet a further object of the invention to produce metallic uranium and/or one or more uranium-containing alloys from uranium oxide by converting the uranium oxide into a uranium chloride in a molten uranium chloride bath and then reacting the uranium chloride with lithium or an alkaline earth metal to form the corresponding lithium chloride or alkaline earth metal chloride, such as magnesium chloride, while reducing the uranium chloride to metallic uranium.

It is a still a further object of the invention to produce metallic uranium and/or one or more uranium-containing alloys from uranium oxide by converting the uranium oxide into a uranium chloride in a molten uranium chloride bath and then reacting the uranium chloride with lithium or an alkaline earth metal, in the presence of controlled quantities of other metals, such as iron, which form eutectic alloys with metallic uranium, to permit molten metal formation at temperatures lower than the melting point of pure metallic uranium. The reaction leads to the formation of the corresponding lithium chloride or alkaline earth metal chloride while reducing the uranium chloride to metallic uranium which alloys with the alloying metal.

These and other objects of the invention will be apparent from the following description and accompanying drawings.

BRIEF DESCRIPTION OF THE DRAWINGS

FIG. 1 is a flow sheet describing the steps of the process of the invention.

DETAILED DESCRIPTION OF THE INVENTION

Figure 2:
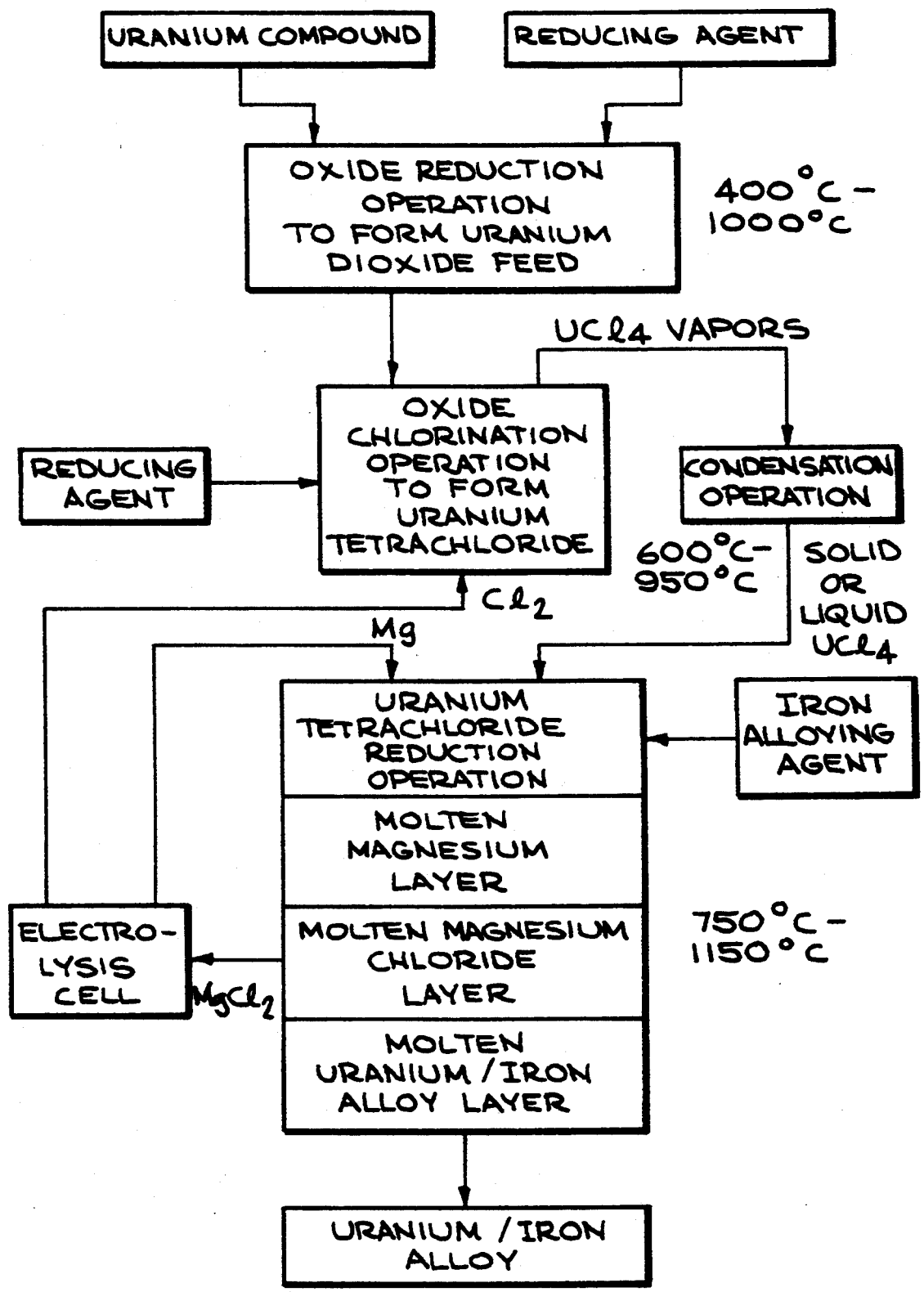
FIG. 2 is a pictorial diagram of the process showing the reaction operations of the invention.

The invention comprises a method of forming metallic uranium, or one or more uranium-containing eutectic alloys, from uranium oxide in a manner which substantially eliminates the formation of uranium-containing wastes. A source of uranium dioxide is first provided, for example, by reducing higher oxides of uranium, such as $UO_3$ or $U_3O_8$, or by using any other substantially stable uranium compound source, to form the uranium dioxide ($UO_2$). This uranium dioxide is then chlorinated, in a molten bath of uranium tetrachloride, to form uranium tetrachloride ($UCl_4$). In a preferred embodiment, the $UCl_4$ is produced as a vapor from a molten bath of $UCl_4$ and the $UCl_4$ vapor is then collected as a solid in a condenser/collector.

The $UCl_4$ is then reduced to metallic uranium by reacting the $UCl_4$ with a reactive metal which will form the chloride of that metal. This last step may be carried out in the presence of another metal capable of forming a eutectic alloy with metallic uranium to thereby lower the melting point of the reduced uranium alloy. The resulting metal chloride formed during the uranium tetrachloride reduction step may then be reduced, for example, in an electrolysis cell, to recover and recycle the metal back to the uranium tetrachloride reduction operation and the chlorine gas back to the uranium dioxide chlorination operation.

a. Formation of Uranium Dioxide

The uranium dioxide feedstock for the subsequent chlorination step may be formed from any uranium source capable of reacting to form uranium dioxide without formation of solid or liquid uranium-containing waste by-products. Preferably the uranium source will comprise a more stable oxide such as uranium trioxide ($UO_3$) or $U_3O_8$. Such a uranium source, which is oxidized to a higher oxide state, may then be reduced to $UO_2$, at a temperature ranging from about 400° C. to about 1000° C., by a reducing agent such as $H_2$, carbon, or CO which preferably will form a gaseous by-product at the reducing temperature, i.e., $CO_2$ or $H_2O$ gas, as shown in the exemplary reaction equations below:

$$UO_3 + H_2 \rightarrow UO_2 + H_2O \uparrow \qquad (1)$$

$$U_3O_8 + C \rightarrow 3UO_2 + CO_2 \uparrow \qquad (2)$$

The reduction reaction to form the desired uranium dioxide may be carried out at ambient pressure in either a batch or continuous type reactor such as a packed bed reactor, Hirshoff furnace, rotary kiln, fluidized bed reactor, etc. The residence time of the uranium in the reactor, to ensure complete conversion of all uranium of higher oxidation states to uranium dioxide, may be empirically determined, for example by testing the emerging product in a continuous type reactor and reducing the feed rate if the emerging product is not completely reduced to $UO_2$ or by simply increasing the residence time for a batch type reactor. Such formations of $UO_2$ from other, more stable, forms of uranium oxides are well known to those skilled in the art.

b. Chlorination of Uranium Dioxide

Figure 3:
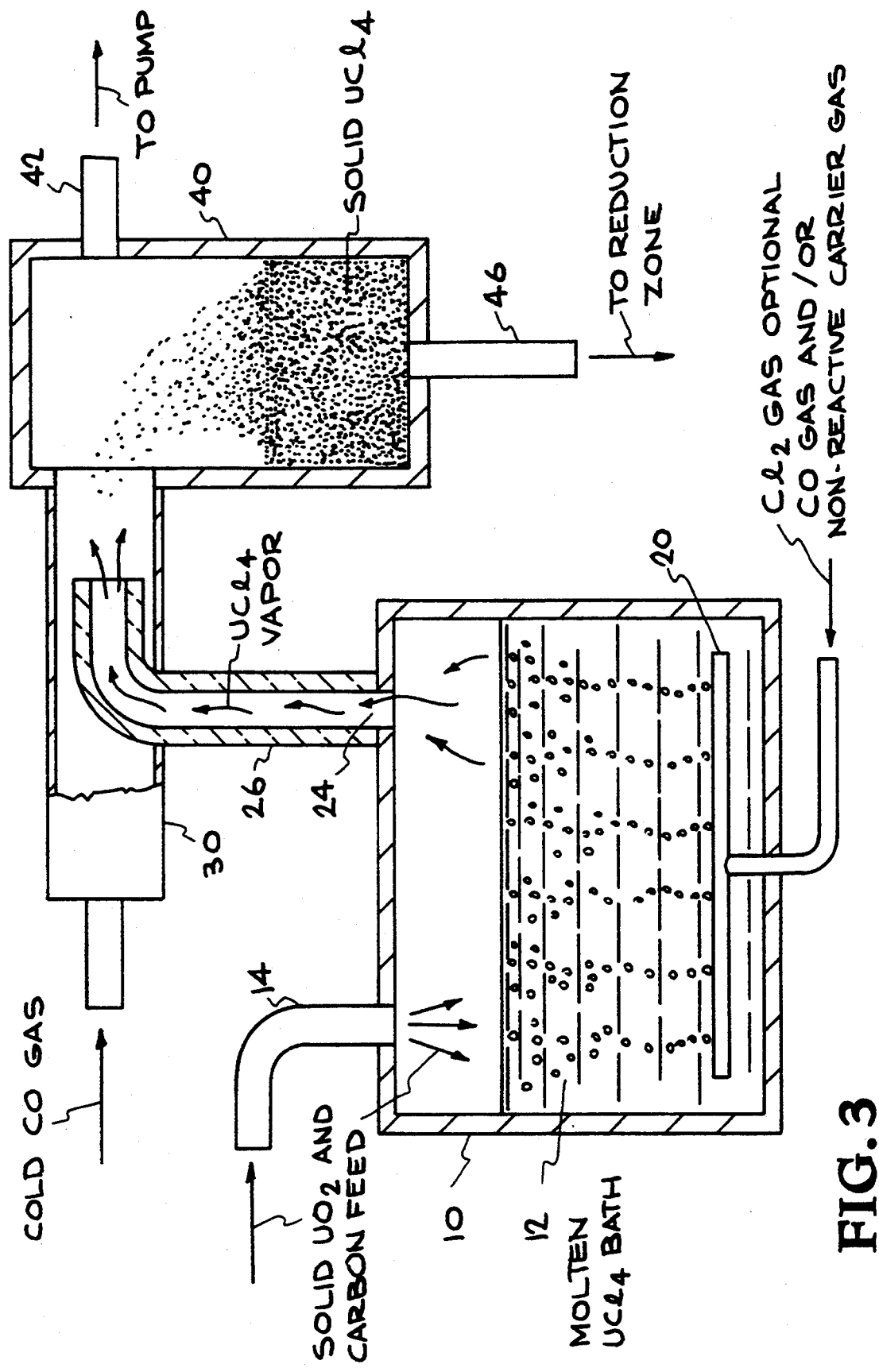
FIG. 3 is a cross-section view of typical apparatus used for the chlorination operation of the pictorial diagram of FIG. 2.

The uranium dioxide ($UO_2$) is now chlorinated to form uranium tetrachloride ($UCl_4$) in a chlorination operation, as shown in FIGS. 2 and 3, by feeding the uranium dioxide in particulate form with a carbonaceous reducing agent through a port 14 in the top of a chlorination reactor 10 having a molten uranium chloride bath 12 therein maintained at a temperature of from just above the melting point of $UCl_4$ to just below the boiling point of $UCl_4$. Preferably the bath will be maintained between about 600° C. and 950° C., and most preferably from about 650° C. to about 750° C., typically, about 700° C. At the same time, into the bottom of molten uranium tetrachloride bath 12 is bubbled chlorine gas, through a sparger ring 20 located adjacent to the bottom of reactor 10, which also serves to agitate bath 12. An additional inert or nonreactive stirring gas such as nitrogen may also be flowed through sparger ring 20 into molten uranium tetrachloride bath 12 if the flow rate of chlorine gas is not sufficient to provide the desired amount of stirring or agitation in the bath, and more importantly as a means for controlling the quantities of gaseous $UCl_4$ leaving the reactor.

It should be noted that minor amounts of $UCl_3$ (i.e., less than about 10 wt. %) may be formed with the $UCl_4$, and the references herein to $UCl_4$ will be understood to include the presence of such a possible impurity.

Preferably, the carbonaceous reducing agent comprises particulate carbon, although the use of CO is also possible, as will be commented upon below. The particulate carbon may be premixed with the particulate uranium dioxide prior to feeding the mixture into the top of bath 12 in reactor 10.

The preferred particle size of the carbon feed is the same as commercially available carbon black (lampblack) materials. Such fine sized carbon materials are found to be more readily wetted by the molten $UCl_4$ bath than coarser forms of carbon such as petroleum coke. The preferred carbon particle size is typically less than about 100 mesh (Tyler). For the uranium dioxide feed, it has been found that the particles dissolve very quickly in the molten $UCl_4$ bath and therefore are relatively independent of particle size. For convenience in handling, $UO_2$ particles of less than about 0.1 inch, and more preferably less than about 0.01 inch, are used. Preferably, both the carbon and uranium dioxide reactants are maintained under a blanket of nitrogen, or other dry non-reactive gas, prior to introduction into the molten uranium tetrachloride bath to thereby inhibit contamination with water which could result in the formation of HCl in the reactor.

It should be noted that while hydrogen is an acceptable reducing agent for use in the formation of the uranium dioxide feedstock, hydrogen should not be used as a reducing agent in the chlorination operation because of the presence of the chlorine gas which might react with hydrogen gas to form hydrogen chloride, which would be a highly undesirable by-product because of its corrosive properties.

The chlorination reaction may be carried out at ambient pressure on a continuous basis with uranium tetrachloride being withdrawn from the reactor in gaseous form through the top of the reactor as shown at exit port 24 in FIG. 3. While the product could be removed from the reactor as a liquid, such a liquid might also contain unreacted materials, e.g., carbon or uranium dioxide, necessitating further separation steps. The chlorination reaction may be illustrated by the following reaction equation:

$$UO_2 + C + 2Cl_2 \rightarrow UCl_4 \uparrow + CO_2 \uparrow \qquad (3)$$

As shown in equation (3), the uranium dioxide and carbon are flowed into the top of the reactor in a stoichiometric molar ratio of 1:1 at a rate, relative to the maximum flow of chlorine into the bottom of the reactor, The maximum chlorine flow rate is that rate which will permit complete reaction of the chlorine gas with the suspended wetted carbon and the dissolved uranium dioxide before the rising gas bubbles (originally composed of chlorine and non-reactive carrier gas) reach the surface to avoid having to scrub excess (non-reacted) chlorine gas. Thus, for example, for a given flow of carbon and uranium dioxide into the top of a molten uranium chloride bath, the rate of chlorine flow will be adjusted, to result in the emergence of no chlorine gas in the bubbles exiting the surface of the bath. In practice, $Cl_2$ input flow may be reduced slightly below the above described limits for a short period of time, e.g., for a few minutes, to provide operating flexibility in maintaining stoichiometric balance.

As an example, in a 6 foot diameter reactor, containing a 3 foot deep bath of molten uranium tetrachloride maintained within a temperature range of about 700°–750° C., with a chlorine gas flow of about 220 gram moles/minute of chlorine, uranium dioxide, having particle sizes in the range of −100 to +325 mesh (Tyler), is fed into the reactor to the surface of the molten bath at a rate of about 30 kilograms per minute (~110 gram moles/minute), and carbon, in the form of commercially obtained carbon black, is fed into the reactor at a rate of about 1.3 kilograms per minute(~110 gram moles/minute), resulting in production of uranium tetrachloride at a rate of 41.6 kilograms/minute (~110 gram moles/minute).

As mentioned above, carbon monoxide (CO) gas may optionally be used instead of carbon as the reducing agent or may be used in small amounts, as needed, to inhibit the partial oxidation of the carbon to CO, rather than to $CO_2$. The rate of flow of CO into reactor 10, which may be introduced into reactor 10 with the chlorine gas flow through sparger ring 20, may vary from 0 to a maximum of 1 mole CO per mole of $Cl_2$. Preferably the ratio of CO to $Cl_2$ will range from about 0:1 to about 1:1.

The uranium tetrachloride ($UCl_4$) vapors leaving reactor 10 are preferably condensed to provide uranium tetrachloride in powder form which is then used as a feedstock for the reduction operation wherein the uranium tetrachloride will be reduced to metallic uranium. It will be understood that a liquid form of uranium tetrachloride may be recovered instead of a solid, if desired.

While any condensation means capable of forming a solid (or liquid) uranium tetrachloride product may be used to recover the uranium chloride vapors leaving the chlorination operation, and the particular illustrated condensation apparatus forms no part of the present invention, in accordance with the best mode of carrying out the process of the invention, the uranium chloride vapors leave chlorination reactor 10 through via exit port 24 which comprises a pipe wrapped with insulation 26. The uranium tetrachloride vapors pass through pipe 24 flow into a larger pipe 30 which surrounds inner pipe 24. A cold gas such as CO and/or $CO_2$, maintained at a temperature at least about 100° C. below the melting point of $UCl_4$, and usually maintained at about room temperature, is flowed through larger pipe 30 to solidify the uranium tetrachloride vapors, by cooling them to a temperature below 590° C., while preventing the vapors, or particles, from depositing on the walls of condensation chamber 40 into which the uranium tetrachloride particles flow and collect. A gas outlet tube 42, located on an upper portion of the opposite wall of chamber 40, provides an exit port for the flow of cool $CO/CO_2$ gas and may be connected to a pump (not shown) to assist in the flow of the cooling gas through outer pipe 30 and condensation chamber 40. The solid uranium tetrachloride powder collected in condensation chamber 40 may be removed through a particle exit port 46 located at the bottom of condensation chamber 40.

c. Reduction of Uranium Tetrachloride to Metallic Uranium

The uranium tetrachloride powder formed and collected in the chlorination operation is now fed to a reduction operation where the uranium tetrachloride will be reduced to form metallic uranium. The uranium tetrachloride is reduced by contacting it with a metal which is a greater reducing agent than uranium in the electromotive-force series, whereby the uranium tetrachloride will reduce to metallic uranium while the other metal is oxidized to form the corresponding chloride of the metal.

A preferred group of reducing metals which may be useful in carrying out this step of the process is either lithium or the alkaline earth metals such as calcium, magnesium, barium, and strontium. Preferably the reducing metal is either calcium or magnesium metal, and most preferably the reducing metal is magnesium. The following equation., using magnesium as the reducing metal by way of illustration, and not of limitation, shows the uranium reduction reaction.

$$UCl_4 + 2Mg \rightarrow U + 2MgCl_2 \qquad (4)$$

While the above reaction is capable of forming metallic uranium, without further additives, the resulting metallic uranium has a melting point of about 1132° C. This necessitates carrying out the reaction at this temperature or higher in order to maintain the uranium in liquid form in the reactor to facilitate its removal when the reaction is carried out on a continuous basis.

It would, therefore, be preferable to add to the reaction another metal which is capable of alloying with the uranium to form an alloy or alloys with lower melting temperatures than pure uranium. Typically, such metals are those which form eutectic systems with uranium. These metals should not interfere with the reduction reaction being carried out. A preferred metal additive for this purpose is iron which, for example, will alloy with uranium at a mole ratio of about 33 mole % iron, 67 mole % uranium to form a low melting eutectic alloy having a melting point of about 725° C.

Other metals which could be used instead of iron, i.e., metals which can form an alloy with a melting point lower than that of pure uranium without, however, interfering with the uranium reduction reaction, include: (a) one or more metals which form eutectic alloy systems with uranium in which uranium is the major alloying constituent (i.e., in the order of 60 mole % or higher), such as chromium, manganese, cobalt, nickel, and the platinum metals ruthenium, rhodium, palladium, osmium, iridium, and platinum; and (b) one or more metals which form eutectic alloy systems with uranium in which uranium is the minor alloying constituent (i.e., in the order of at least about 1 mole %, but less than about 15 mole %) such as aluminum, gold, silver, copper, germanium, and zinc.

By use of the term "eutectic alloy systems" is meant a mixture of uranium and one or more other metals wherein a minimum melting temperature is observed at a temperature lower than the melting temperature of pure uranium. It does not, however, mean that the ratio of uranium to that metal must be at the point which will form such a minimum temperature.

In such cases, hereinafter referring to iron as the alloying additive, and magnesium as the reducing metal, by way of illustration, and not of limitation, equation (4) above would be modified as follows:

$$UCl_4 + 0.5Fe + 2Mg \rightarrow U/0.5Fe + 2MgCl_2 \quad (5)$$

Figure 4:
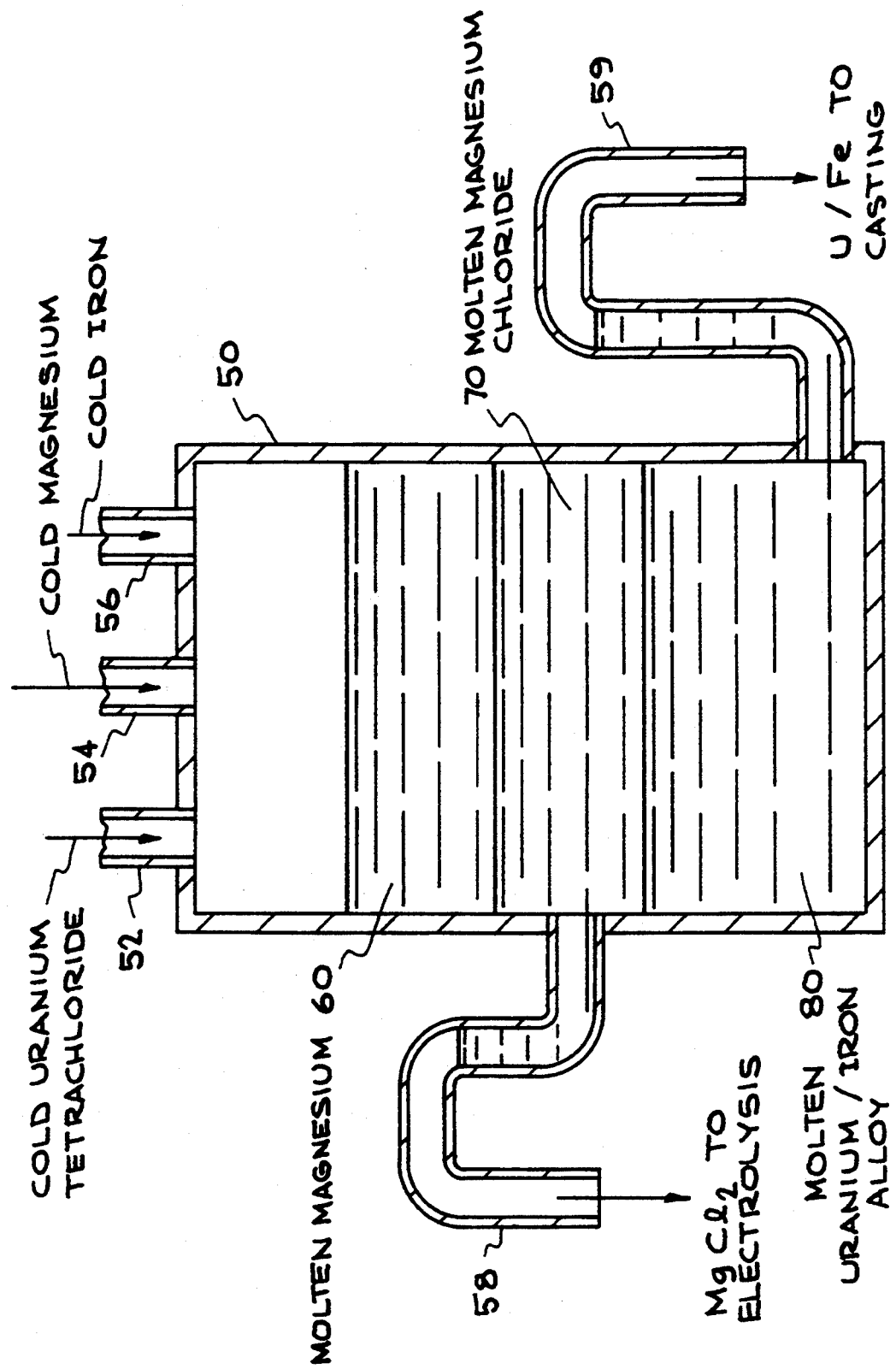
FIG. 4 is a cross-section view of typical apparatus used for the reduction operation of the pictorial diagram of FIG. 2.

The reduction operation comprises a reduction reactor 50, as shown in FIG. 4, which contains a molten top layer 60 of the reducing metal, floating on a molten intermediate layer 70 of the chloride of that metal which in turn, is floating on a molten bottom layer 80 of uranium or uranium alloy. Thus, for example, when magnesium is used as the reducing metal, a layer of molten magnesium will comprise top layer 60, a layer of molten magnesium chloride will comprise intermediate layer 70, and a molten layer of metallic uranium or uranium-containing alloy will comprise bottom layer 80.

Preferably, the molten bath is maintained within a range of from about 725° C. to about 1150° C., and most preferably at a range of from about 900° C. to about 1050° C., and, therefore, a eutectic-forming alloying metal such as iron is preferably used. This temperature range may be easily maintained by feeding the uranium tetrachloride, the reducing metal, and the alloying metal into the molten bath as solids at ambient temperature respectively through entrance ports 52, 54, and 56 (or through a single port) at the top of reduction reactor 50. The exothermic heat of reaction liberated during the metallothermic reduction of the uranium tetrachloride has been found to approximately balance the heat needed to melt and heat the solid reactants being fed into the molten bath, thus minimizing requirements for either heating or cooling means during continuous operations. Of course, heating means must be provided to heat reactor 50 to the operating temperature before initiating the reaction.

As seen in FIG. 4, differences in the specific gravities permit separation of the respective liquid layers. For example, when magnesium constitutes the reducing metal, it will float on top, i.e., form top layer 60, because its density is about 1.5 grams/cc, while the density of the intermediate magnesium chloride layer 70 is about 2 grams/cc, and the density of the uranium/iron alloy, forming lowest layer 80, is about 15 grams/cc.

Thus, as the uranium tetrachloride fed from the top of reactor 50 passes through molten magnesium layer 60, the magnesium reduces the uranium tetrachloride to produce uranium and magnesium chloride. The uranium then falls to the bottom of the bath, into layer 80, while magnesium chloride becomes incorporated in the middle layer 70. At the same time more magnesium is fed into reactor 50 through entrance port 54 to replenish molten magnesium layer 60.

The iron alloying metal, added to the top of the bath through entrance port 56, sinks to the bottom where it alloys with the reduced uranium to form the desired uranium/iron eutectic alloy. It should be noted that the iron has little solubility in the magnesium. However, should the eutectic-forming metal be also capable of alloying with the reducing metal (as well as with uranium), there can be a different distribution of the liquid layers. For instance, when nickel is used in place of iron, a nickel-magnesium molten alloy is formed which has a higher density than $MgCl_2$. In this case, the $MgCl_2$ layer forms above the magnesium-nickel layer.

As shown in FIG. 4, taps 58 and 59 are respectively provided on the sides of reactor 50 so that magnesium chloride layer 70 and uranium/iron alloy layer 80 can be periodically, or continuously, tapped to remove portions of these layers. The molten uranium/iron alloy may be poured directly into casting molds to form solid feed which may then be used for purposes such as an isotopic separation process which uses a solid metallic uranium feedstock.

d. Reduction and Recycling of Metal Chloride Salt

In accordance with another aspect of the process of the invention, the resulting metal chloride salt, such as magnesium chloride, removed from reduction reactor 50 through exit port 58, as shown in FIG. 4, may be fed to an electrolysis cell where the chloride salt may be reduced for the recycle of the metal back to the uranium chloride reduction operation and the resulting chlorine gas produced during the electrolysis reaction may be recycled back to the chlorination operation for use in chlorinating the uranium dioxide, as shown in FIG. 2. For the case in which magnesium is the reducing metal, such electrolysis cells are commercially available for the production of pure magnesium and are, for example, widely used, for a similar recycle of salt by-products in the commercial production of titanium metal from $TiCl_4$.

Using such a recycling step in the process results in the formation of substantially no uranium-contaminated waste products since the metal chloride salt, which may contain some uranium, is reused in the reduction operation, and the chlorine gas is also continuously recycled for use in the chlorination operation.

Thus, the CO and $CO_2$ gases (or $H_2O$ vapors), produced during the initial oxidation step to form the uranium dioxide, and the $CO_2$ gas, produced in the chlorination step to form the uranium tetrachloride, are the only waste materials which leave the reactors and these gases may be cleaned using appropriate scrubber devices to minimize any uranium-containing by-products exiting with the gaseous effluent.

The process of the invention produces metallic uranium, or an alloy of uranium and another metal when a lower melting point is desired, wherein an oxide of uranium may be chlorinated in a molten bath of the same materials, and the resulting uranium tetrachloride may then be reduced by contact with a metal which is a greater reducing agent in the electromotive-force series of elements, and the metal chloride salt may then be reduced and both the metal and chlorine gas recycled back to the process, resulting in the production of substantially no uranium-containing waste products to thereby eliminate waste disposal problems.

While a specific embodiment of the process of forming metallic uranium, or a uranium-containing alloy has been illustrated and described for carrying out the process in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. A process for forming metallic uranium which comprises:
   a) providing a source of uranium dioxide ($UO_2$);
   b) chlorinating said uranium dioxide to form uranium tetrachloride ($UCl_4$); and
   c) reducing said uranium tetrachloride in a molten reduction bath consisting essentially of molten metal, a reducing metal, and the chloride salt of said reducing metal by reacting said uranium tetrachloride with said reducing metal in molten form in said bath which is a greater reducing agent than uranium in the electromotive-force series of elements, wherein the temperature of said molten metal reduction bath is maintained sufficiently high to permit recovery of said metallic uranium in molten form from said reduction bath.

2. A process for forming metallic uranium which comprises:
   a) providing a source of uranium dioxide ($UO_2$);
   b) feeding said uranium dioxide into a molten bath consisting essentially of uranium tetrachloride and a reducing agent to form uranium tetrachloride ($UCl_4$);
   c) chlorinating said uranium dioxide in said molten bath of uranium tetrachloride to form uranium tetrachloride; and
   d) reducing said uranium tetrachloride by reacting said uranium tetrachloride with a reducing metal which is a greater reducing agent than uranium in the electromotive-force series of elements in a molten metal reduction bath maintained at a temperature sufficiently high to permit recovery Of said metallic uranium in molten form from said reduction bath.

3. The process of claim 2 wherein said step of providing a source of uranium dioxide further comprises reducing a uranium oxide in a higher oxidation state to uranium dioxide.

4. The process of claim 3 wherein said uranium oxide in a higher oxidation state is selected from the group consisting of $UO_3$ and $U_3O_8$.

5. The process of claim 3 wherein said step of reducing said uranium oxide in a higher oxidation state to uranium dioxide further comprises contacting said uranium oxide with a reducing agent selected from the group consisting of hydrogen and carbon, whereby no solid residues will be formed during said reduction step to form uranium dioxide.

6. The process of claim 5 wherein said step of reducing said uranium oxide is carried out in a reactor maintained at a temperature ranging from about 400° C. to about 1000° C.

7. The process of claim 2 wherein said step of chlorinating said uranium dioxide to form uranium tetrachloride in a bath consisting essentially of molten uranium tetrachloride and a reducing agent, further comprises chlorinating said uranium dioxide in the presence of a carbonaceous reducing agent.

8. The process of claim 7 wherein said step of chlorinating said uranium dioxide to form uranium tetrachloride in the presence of a carbonaceous reducing agent in a bath of molten uranium tetrachloride further comprises chlorinating said uranium dioxide in the presence of particulate carbon.

9. The process of claim 7 wherein said step of chlorinating said uranium dioxide to form uranium tetrachloride in a bath of molten uranium tetrachloride further comprises flowing a mixture of chlorine gas and carbon monoxide into said molten bath of uranium tetrachloride in a carbon monoxide/chlorine molar ratio of from 0:1 to 1:1.

10. The process of claim 7 wherein said step of chlorinating said uranium dioxide to form uranium tetrachloride in the presence of a carbonaceous reducing agent in a bath of molten uranium tetrachloride further comprises flowing a non-reactive gas into said molten bath with said chlorine gas.

11. The process of claim 8 wherein said step of chlorinating said uranium dioxide to form uranium tetrachloride in the presence of a particulate carbon reducing agent in a bath of molten uranium tetrachloride further comprises maintaining said molten bath of uranium tetrachloride at a temperature ranging from just above the melting point of $UCl_4$ to just below the boiling point of $UCl_4$.

12. The process of claim 2 including the further step of condensing said $UCl_4$, after said chlorination step, into a liquid or a solid prior to said step of reducing said $UCl_4$.

13. The process of claim 2 wherein said step of reducing said uranium tetrachloride by reacting said uranium tetrachloride with a reducing metal which is a greater reducing agent than uranium in the electromotive-force series of elements further comprises reacting said uranium tetrachloride with lithium or an alkaline earth metal selected from the group consisting of calcium, barium, strontium, and magnesium.

14. The process of claim 13 wherein said alkaline earth metal is selected from the group consisting of calcium and magnesium.

15. The process of claim 2 wherein said step of reducing said uranium tetrachloride by reacting said uranium tetrachloride with a reducing metal which is a greater reducing agent than uranium in the electromotive-force series of elements further comprises reacting said uranium tetrachloride with magnesium.

16. The process of claim 2 wherein said step of reducing said uranium tetrachloride is carried out in a reactor having therein a molten bed of said reducing metal maintained at a temperature of from about 725° C. to about 1150° C.

17. A process for forming metallic uranium which comprises:
   a) providing a source of uranium dioxide ($UO_2$); b) chlorinating said uranium dioxide to form uranium tetrachloride ($UCl_4$); and
   c) reducing said uranium tetrachloride to metallic uranium by reacting said uranium tetrachloride with a reducing metal which is a greater reducing agent than uranium in the electromotive-force series of elements, in the presence of an alloying metal capable of forming one or more alloys with the resulting reduced uranium metal to thereby lower the temperature at which said uranium will be in a liquid state.

18. The process of claim 17 wherein said step of reducing said uranium tetrachloride is carried out in the presence of an alloying metal selected from the group consisting of iron, chromium, manganese, cobalt, nickel, ruthenium, rhodium, palladium, osmium, iridium, and platinum, to form one or more alloys with the resulting reduced uranium metal to thereby lower the temperature at which said uranium will be in a liquid state.

19. The process of claim 17 wherein said step of reducing said uranium tetrachloride is carried out in the presence of an alloying metal selected from the group consisting of aluminum, gold, silver, copper, germanium, and zinc, to form one or more alloys with the resulting reduced uranium metal to thereby lower the temperature at which said uranium will be in a liquid state.

20. The process of claim 2 wherein said step of reducing said uranium tetrachloride by reacting said uranium tetrachloride with said reducing metal which is a greater reducing agent than uranium in the electromotive-force series of elements further comprises forming a chloride salt of said reducing metal; and said process further comprises the steps of:
   a) feeding said chloride salt of said reducing metal to an electrolysis cell to reduce said reducing metal and to form chlorine gas;
   b) recycling said reduced reducing metal back to said uranium tetrachloride reduction step; and
   c) recycling said chlorine gas back to said uranium dioxide chlorination step.

21. A process for forming metallic uranium which comprises:
   a) providing a source of uranium dioxide ($UO_2$);
   b) chlorinating said uranium dioxide in a molten bath of uranium tetrachloride in the presence of a carbonaceous reducing agent to form uranium tetrachloride ($UCl_4$); and
   c) reducing said uranium tetrachloride by reacting said uranium tetrachloride with a reducing agent selected from the group consisting of lithium and an alkaline earth metal in a molten metal reduction bath maintained at a temperature sufficiently high to permit recovery of said metallic uranium in molten form from said reduction bath.

22. The process of claim 20 wherein said step of providing a source of uranium dioxide further comprises reducing a uranium oxide selected from the group consisting of $UO_3$ and $U_3O_8$ while contacting said uranium oxide with a reducing agent selected from the group consisting of hydrogen and carbon, whereby no solid residues will be formed during said reduction step to form said uranium dioxide.

23. The process of claim 20 wherein said step of chlorinating said uranium dioxide to form uranium tetrachloride in the presence of a particulate carbon reducing agent in a bath of molten uranium tetrachloride in the presence of a carbonaceous reducing agent further comprises the use of a particulate carbon reducing agent, and flowing a mixture of chlorine gas and carbon monoxide into said molten bath of uranium tetrachloride in a carbon monoxide/chlorine molar ratio of from 0:1 to 1:1.

24. The process of claim 20 wherein said step of reducing said uranium tetrachloride by reacting said uranium tetrachloride with a reducing agent comprises reacting said uranium tetrachloride with magnesium.

25. The process of claim 20 wherein said step of reducing said uranium tetrachloride is carried out in the presence of an alloying metal capable of forming one or more alloys with the resulting reduced uranium metal to thereby lower the temperature at which said uranium will be in a liquid state.

26. The process of claim 20 wherein said step of reducing said uranium tetrachloride is carried out in the presence of iron to thereby form an alloy of uranium and iron to lower the temperature at which said uranium will be in a liquid state.

27. A process for forming metallic uranium which comprises:
   a) forming uranium dioxide ($UO_2$) by reducing a uranium oxide selected from the group consisting of $UO_3$ and $U_3O_8$ while contacting said uranium oxide with a reducing agent selected from the group consisting of hydrogen and carbon, whereby no solid residues will be formed during said reduction step to form said uranium dioxide;
   b) chlorinating said uranium dioxide in a molten bath of uranium tetrachloride in the presence of a particulate carbon reducing agent to form uranium tetrachloride ($UCl_4$) by flowing a mixture of chlorine gas and carbon monoxide into said molten bath of uranium tetrachloride in a carbon monoxide/chlorine molar ratio of from 0:1 to 1:1; and
   c) reducing said uranium tetrachloride by reacting said uranium tetrachloride with magnesium metal to form metallic uranium and magnesium chloride in a molten metal reduction bath maintained at a temperature sufficiently high to permit recovery of said metallic uranium in molten form from said reduction bath.

28. The process of claim 20 wherein said step of reducing said uranium tetrachloride is carried out in the presence of a metal capable of forming an alloy with the resulting reduced uranium metal to thereby lower the temperature at which said uranium will be in a liquid state.

29. The process of claim 20 wherein said step of reducing said uranium tetrachloride is carried out in the presence of iron to thereby form a eutectic alloy of uranium and iron to lower the temperature at which said uranium will be in a liquid state.

30. The process of claim 20 wherein said process further comprises the steps of:
   a) feeding said magnesium chloride salt to an electrolysis cell to form metallic magnesium and chlorine gas;
   b) recycling said magnesium metal back to said uranium tetrachloride reduction step; and
   c) recycling said chlorine gas back to said uranium dioxide chlorination step.

* * * * *